United States Patent [19]
Nonomura

[11] Patent Number: 5,748,712
[45] Date of Patent: May 5, 1998

[54] FACSIMILE SYSTEM OF DISTINCTIVE RINGING TYPE CAPABLE OF AUTOMATIC FACSIMILE RECEPTION EVEN WHEN RECEIVED CALL SIGNAL CALLS TELEPHONE NUMBER FOR TELEPHONE RECEPTION

[75] Inventor: Yutaka Nonomura, Iwakura, Japan

[73] Assignee: Brother Kogyo Kabushiki Kaisha, Nagoya, Japan

[21] Appl. No.: 348,900

[22] Filed: Nov. 25, 1994

[30] Foreign Application Priority Data

Dec. 7, 1993 [JP] Japan ................. 5-306851

[51] Int. Cl.$^6$ ................. H04M 1/64; H04M 11/00
[52] U.S. Cl. ................. 379/93; 379/67; 379/372; 379/373
[58] Field of Search ................. 379/67, 70, 82, 379/88, 89, 93, 96, 97, 100, 102, 104, 105, 142, 156, 164, 167, 170, 172, 173, 177, 179, 181, 182, 183, 187, 251, 252, 350, 352, 354, 372, 373, 374, 375, 376, 418

[56] References Cited

U.S. PATENT DOCUMENTS

| | | | |
|---|---|---|---|
| 3,689,705 | 9/1972 | Pinede et al. | 379/180 |
| 3,928,732 | 12/1975 | Simon et al. | 379/164 |
| 3,946,146 | 3/1976 | Brown et al. | 379/164 |

(List continued on next page.)

FOREIGN PATENT DOCUMENTS

| | | | |
|---|---|---|---|
| 55-149798 | 5/1982 | Japan | 379/374 |
| 57-184357 | 11/1982 | Japan | 379/374 |
| 59-049050 | 3/1984 | Japan | 379/373 |
| 60-196057 | 10/1985 | Japan | 379/350 |
| 61-287361 | 12/1986 | Japan | 379/374 |
| 63-007060 | 1/1988 | Japan | 379/375 |
| 63-104550 | 5/1988 | Japan | 379/375 |
| 63-157551 | 6/1988 | Japan | 379/381 |
| 63-256038 | 10/1988 | Japan | 379/373 |
| 63-258143 | 10/1988 | Japan. | |
| 63-268338 | 11/1988 | Japan | 379/374 |
| 63-278455 | 11/1988 | Japan | 379/373 |
| 01279658 | 11/1989 | Japan | 379/374 |
| 02027821 | 1/1990 | Japan | 379/374 |
| 02079547 | 3/1990 | Japan | 379/374 |
| 02183659 | 7/1990 | Japan | 379/372 |
| 02218249 | 8/1990 | Japan | 379/375 |
| 02303251 | 12/1990 | Japan | 379/375 |
| 4-48855 | 2/1992 | Japan. | |
| 05110635 | 4/1993 | Japan | 379/350 |
| 05153227 | 6/1993 | Japan | 379/214 |
| 2193419 | 2/1988 | United Kingdom | 379/373 |
| 9112685 | 8/1991 | WIPO | 379/374 |

OTHER PUBLICATIONS

"Dialing for Dollars", The Washington Post, Washington Business, Jan. 15, 1990, p. 3 [379/373].

"Speech–Synthesis Telephone Call Annunciator", IBM Technical Disclosure Bulletin, vol. 31, No. 8, Jan. 1989 pp. 261–264.

Primary Examiner—Krista M. Zele
Assistant Examiner—Scott L. Weaver
Attorney, Agent, or Firm—Oliff & Berridge

[57] ABSTRACT

A facsimile system of distinctive ringing type capable of selective telephone and facsimile communications with a remote party calling one of telephone numbers used by the system such that the telephone numbers are called by respective call signals having respective different patterns, the system including a pattern registering device for registering as a facsimile reception pattern the pattern of the call signal assigned to call the telephone number which is exclusively used to receive a facsimile signal from the remote party, a pattern determining device for determining whether the received call signal has the registered facsimile reception pattern, a facsimile receiving device for automatically processing the facsimile signal if the call signal has the facsimile reception pattern, and a conditional facsimile reception device for automatically processing the facsimile signal if a predetermined condition is satisfied, even if the received call signal does not have the registered facsimile reception pattern.

15 Claims, 12 Drawing Sheets

U.S. PATENT DOCUMENTS

| | | | |
|---|---|---|---|
| 4,192,007 | 3/1980 | Becker | 379/100 X |
| 4,282,410 | 8/1981 | Gauthier et al. | 379/418 |
| 4,477,697 | 10/1984 | Judd et al. | 379/375 |
| 4,578,540 | 3/1986 | Borg et al. | 379/387 X |
| 4,646,347 | 2/1987 | Liu | 379/375 |
| 4,677,660 | 6/1987 | Yoshida | 379/100 |
| 4,720,848 | 1/1988 | Akiyama | 379/88 |
| 4,782,518 | 11/1988 | Mattley et al. | 379/201 |
| 4,802,202 | 1/1989 | Takahashi et al. | 379/67 |
| 4,850,012 | 7/1989 | Mehta et al. | 379/157 |
| 4,995,075 | 2/1991 | Angiolillo-Bent et al. | 379/142 |
| 4,998,273 | 3/1991 | Nichols | 379/102 |
| 5,040,209 | 8/1991 | Greenburg et al. | 379/373 |
| 5,073,922 | 12/1991 | Okada | 379/164 |
| 5,086,458 | 2/1992 | Bowen | 379/180 |
| 5,119,418 | 6/1992 | Dupillier | 379/373 |
| 5,142,569 | 8/1992 | Peters et al. | 379/201 |
| 5,200,992 | 4/1993 | Yoshino | 379/93 |
| 5,200,994 | 4/1993 | Sasano et al. | 379/142 |
| 5,253,289 | 10/1993 | Tanaka | 379/373 |
| 5,299,256 | 3/1994 | Hu | 379/96 |
| 5,307,059 | 4/1994 | Connary et al. | 379/71 X |
| 5,309,434 | 5/1994 | Maekawa | 379/96 X |
| 5,323,451 | 6/1994 | Yatsunami | 379/100 |
| 5,333,190 | 7/1994 | Eyster | 379/375 |
| 5,357,562 | 10/1994 | Metser et al. | 379/67 |
| 5,361,296 | 11/1994 | Reyes et al. | 379/96 |
| 5,371,781 | 12/1994 | Ardon | 379/59 |
| 5,425,089 | 6/1995 | Chan et al. | 379/183 |
| 5,428,673 | 6/1995 | Nakagawa et al. | 379/100 |
| 5,432,844 | 7/1995 | Core et al. | 379/67 |
| 5,442,463 | 8/1995 | Ohnishi | 379/97 X |
| 5,442,692 | 8/1995 | Yamozoki et al. | 379/253 |
| 5,446,784 | 8/1995 | MacTaggart | 379/102 |
| 5,452,346 | 9/1995 | Miyamoto | 379/142 |
| 5,452,354 | 9/1995 | Kyronlahti et al. | 379/375 |
| 5,471,522 | 11/1995 | Sells et al. | 379/97 |
| 5,481,599 | 1/1996 | MacAllister et al. | 379/374 X |
| 5,485,508 | 1/1996 | Ho | 379/97 |
| 5,490,210 | 2/1996 | Sasso | 379/100 |
| 5,499,287 | 3/1996 | Campbell et al. | 379/373 X |

| MAIN ITEMS | SUB-ITEMS |
|---|---|
| 1. TEMP SETTING | 1. TIMER<br>2. POLLING<br>⋮ |
| 2. CANCEL JOB | N / A |
| 3. PRINT REPORT | 1. ACT REPORT<br>2. ALL DIAL<br>⋮ |
| 6. TEL OPTION | 1. TONE / PULSE<br>2. RING DELAY<br>⋮<br>7. DISTINCTIVE |
| 7. SETUP SYSTEM | 1. DATE / TIME |

FIG. 3

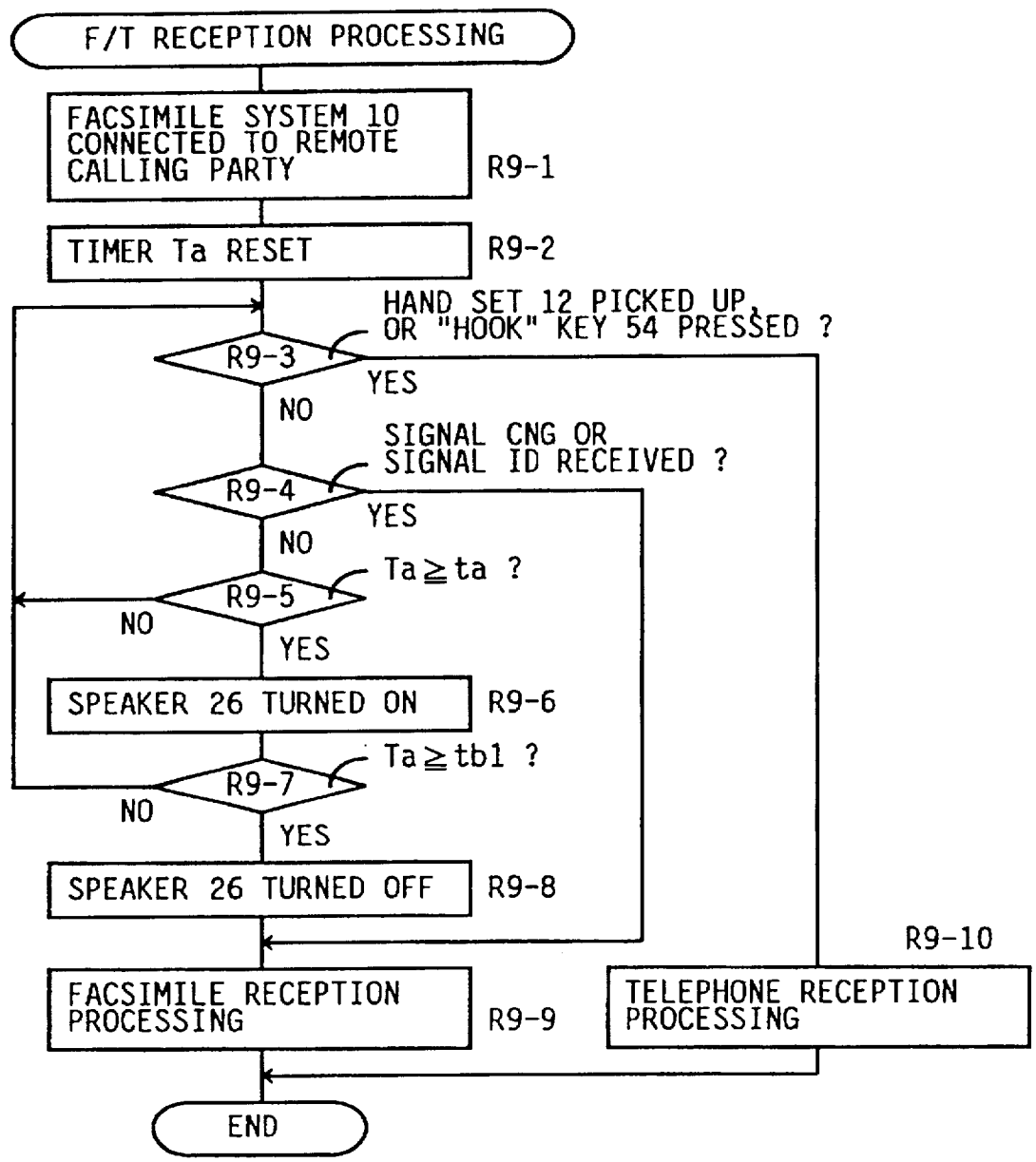

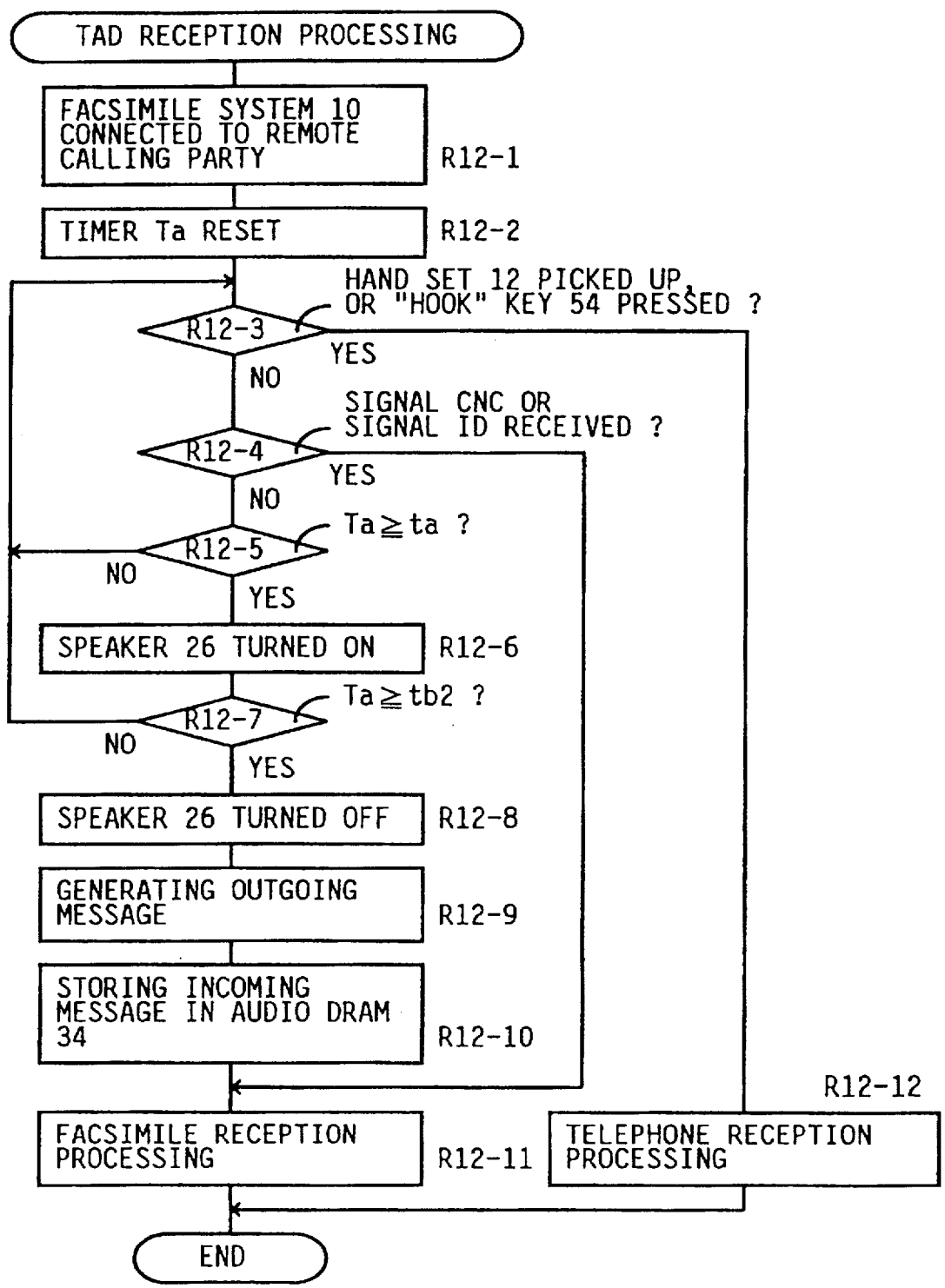

5,748,712

FACSIMILE SYSTEM OF DISTINCTIVE RINGING TYPE CAPABLE OF AUTOMATIC FACSIMILE RECEPTION EVEN WHEN RECEIVED CALL SIGNAL CALLS TELEPHONE NUMBER FOR TELEPHONE RECEPTION

BACKGROUND OF THE INVENTION

1. Field of the Invention

The present invention relates in general to a facsimile system (telephone/facsimile system) of distinctive ringing type capable of generating different ringing sounds for different telephone numbers called by respective call signals having different patterns. More particularly, the present invention is concerned with improvements in such facsimile system which is adapted to effect automatic facsimile signal reception and processing when the pattern of the received call signal is the same as a predetermined pattern for facsimile signal reception. Namely, the present invention relates in particular to techniques for permitting automatic facsimile signal reception under some conditions even when the pattern of the call signal is different from the predetermined facsimile reception pattern.

2. Discussion of the Related Art

There is known a facsimile system which uses a single telephone number and which is capable of selective telephone or facsimile communication with a remote facsimile system. This type of facsimile system has different signal reception modes, namely, different modes of operation when the system receives a call signal from a telephone exchange company. For example, the facsimile system of a called party has a manual reception mode, an automatic reception mode and a selective facsimile/telephone reception mode (F/T reception mode). In the manual mode, telephone communication can be effected when the user of the system (telephone/facsimile receiver of the called party) picks up a telephone hand set provided in the system. When the user performs a given operation on a control panel provided in the system, a facsimile signal if received following the call signal is received and processed for recording of an image represented by the facsimile signal. In the automatic reception mode, the facsimile system automatically processes the facsimile signal for image recording. In the F/T reception mode, telephone communication is made possible if the telephone hand set is picked up within a predetermined time after a ringing sound is generated by a ringing device in response to the received call signal. If the telephone hand set is not picked up or is kept hung up for more than the predetermined time after the generation of the ringing sound, a facsimile signal if received following the call signal is processed for image recording. The facsimile signal is also processed for image recording if the facsimile system in the F/T receives a signal which indicates the transmission of the facsimile signal from the remote facsimile transmitter, or a signal which requests the processing of the facsimile signal at the called party, or if the hand set is kept hung up for more than the predetermined time after the generation of the ringing sound. The user of the facsimile system can select one of the above three signal reception modes as needed.

There is also known a facsimile system (telephone/facsimile system) adapted to utilize a so-called "distinctive ringing service (D/R service)" available from a telephone exchange company, which system uses two or more telephone numbers on one telephone line. The distinctive ringing service provides the facsimile system with telephone call signals which have different patterns as illustrated at (a) through (d) in FIG. 11, when the respective telephone numbers are called by the remote telephone or facsimile transmitter of the calling party, so that the ringing device of the facsimile system of the receiving or called party generates different types of ringing sound depending upon the telephone numbers being called.

In one proposed facsimile system of distinctive ringing type, the pattern of a selected call signal is stored in a memory of the system, as a facsimile reception pattern. When the system receives each call signal (referred to as "call signal CI", the "CI" representing a call indicator), the system performs the following steps as indicated in FIG. 12: checking whether the received call signal CI has the stored facsimile reception pattern; automatically processing the received facsimile signal if the received signal pattern is the same as the facsimile reception pattern; and if not, activating the ringing device of the system to generate a ringing sound so that the user of the system can pick up the hand set for telephone communication with the remote calling party. An example of such facsimile system is disclosed in JP-A-4-48855.

However, the proposed facsimile system of distinctive ringing type described above suffers from the following problem.

The user of an ordinary or conventional facsimile system using a single telephone number for telephone and facsimile communications (reception and transmission) may purchase a new facsimile system of distinctive ringing type adapted to utilize the distinctive ringing service, and add a new or second telephone number so that the two telephone numbers are used for the new facsimile system. If the first or conventionally used telephone number is used exclusively for the facsimile reception in the new system, namely, if the pattern of the call signal corresponding to this first telephone number is used as the facsimile reception pattern, the new system cannot receive a telephone call addressed to the old telephone number. If the second or new telephone number is used exclusively for the facsimile reception, the new system simply activates the ringing device when the system receives the call signal calling the first or old telephone number for facsimile transmission, and the user of the system is required to manipulate the system for receiving the facsimile signal from the remote facsimile transmitter calling the old telephone number. If the facsimile system of the called party is not attended by the user, the facsimile signal cannot be received by the facsimile system.

SUMMARY OF THE INVENTION

It is therefore an object of the present invention to provide a facsimile system of distinctive ringing type which permits automatic facsimile signal reception and processing if a predetermined condition is satisfied, even when the pattern of a received call signal is different from a predetermined pattern for the facsimile reception.

The above object may be achieved according to the principle of the present invention, which provides a facsimile system of distinctive ringing type of a called party capable of effecting selective telephone and facsimile communications with a remote calling party calling one of a plurality of telephone numbers used by the facsimile system, the plurality of telephone numbers being called by respective call signals having respective different patterns, the facsimile system comprising: (a) pattern registering means for registering, as a facsimile reception pattern, the pattern of one of the call signals which is assigned to call one of the telephone numbers that is exclusively used to receive a facsimile signal from the remote calling party; (b) pattern determining means for determining whether the received call signal has the facsimile reception pattern registered by the pattern registering means; (c) facsimile receiving means, responsive to the pattern determining means, for automatically processing the facsimile signal for recording of an image represented by the facsimile signal, if the pattern determining means determines that the received call signal has the facsimile reception pattern; and (d) conditional facsimile reception means, responsive to the pattern determining means, for automatically processing the facsimile signal for recording of the image, if the pattern determining means determines that the received call signal does not have the facsimile reception pattern and if one of at least one predetermined condition is satisfied.

In the facsimile system of the present invention constructed as described above, the pattern determining means determines whether the received call signal has the facsimile reception pattern registered by the pattern registering means. If the pattern determining means determines whether the pattern of the received call signal is the same as the registered facsimile reception pattern, then the facsimile receiving means automatically processes the facsimile signal received from the remote calling party so that an image represented by the facsimile signal is recorded on a recording medium. Even if the received call signal does not have the registered facsimile reception pattern, the facsimile signal is automatically processed for recording by the conditional facsimile reception means, if one of the predetermined condition or conditions is satisfied.

According to the present invention, the facsimile signal received with the call signal which calls the telephone number not used for facsimile reception can be processed for recording of the corresponding image, if a predetermined condition is satisfied. The present facsimile system of distinctive ringing type may be suitably used such that a new telephone number is added for exclusive use to receive a facsimile signal, in addition to the telephone number which has been used for both telephone and facsimile communications. In this case, the pattern of the call signal calling the new telephone number is registered as the facsimile reception pattern so that the facsimile signal received with the call signal having the registered facsimile reception pattern is automatically processed for image recording, and so that the facsimile signal received with the call signal not having the registered facsimile reception pattern may be automatically processed in some instances, such as where a predetermined time has passed after the reception of the call signal while the facsimile system is unattended by the user.

The conditional facsimile reception means may comprise condition determining means for determining if one of the predetermined condition or conditions is satisfied. The condition determining means may be adapted to determine whether the facsimile system is placed in an automatic facsimile reception mode. In this case, the conditional facsimile reception means processes the facsimile signal which is received with the call signal not having the facsimile reception pattern, if the condition determining means determines that the facsimile system is placed in the automatic facsimile reception mode, even if the pattern determining means determines that the call signal does not have the facsimile reception pattern.

The condition determining means may alternatively be adapted, or may be further adapted to determine whether the facsimile system is placed in a selective facsimile/telephone reception mode and whether a predetermined time has passed after reception of the call signal or whether a predetermined signal is received following the call signal. In this case, the conditional facsimile reception means processes the facsimile signal received with the call signal not having the facsimile reception pattern, if the condition determining means determines that the facsimile system is placed in the selective facsimile/telephone reception mode and that the predetermined time has passed after reception of the call signal or the predetermined signal is received following the call signal, even if the pattern determining means determines that the call signal does not have the facsimile reception pattern. The predetermined signal may be a signal indicating that the facsimile signal will be transmitted from the remote calling party to the called party, or a signal requesting the called party to process the facsimile signal at the called party.

The condition determining means may alternatively be adapted, or may be further adapted to determine whether the facsimile system is placed in a telephone answering mode and whether a predetermined time has passed after reception of the call signal or a predetermined signal as indicated above is received following the call signal. In this instance, the conditional facsimile reception means processes the facsimile signal received with the call signal not having the facsimile reception pattern, if the condition determining means determines that the facsimile system is placed in the telephone answering mode and that the predetermined time has passed or the predetermined signal is received following the call signal, even if the pattern determining means determines that the call signal does not have the facsimile reception pattern.

BRIEF DESCRIPTION OF THE DRAWINGS

The above and other objects, features and advantages of this invention will be better understood by reading the following detailed description of a presently preferred embodiment of the invention, when considered in connection with the accompanying drawings, in which:

FIG. 3 is a view indicating some of functions that can be set by FUNCTION and SELECTOR keys on the control and display panel of FIG. 2;

FIG. 9 is a flow chart illustrating a sub-routine executed in step R9 of the routine of FIG. 7;

FIG. 10 is a flow chart illustrating a sub-routine executed in step R12 of the routine of FIG. 7;

DETAILED DESCRIPTION OF THE PREFERRED EMBODIMENT

Figure 1:
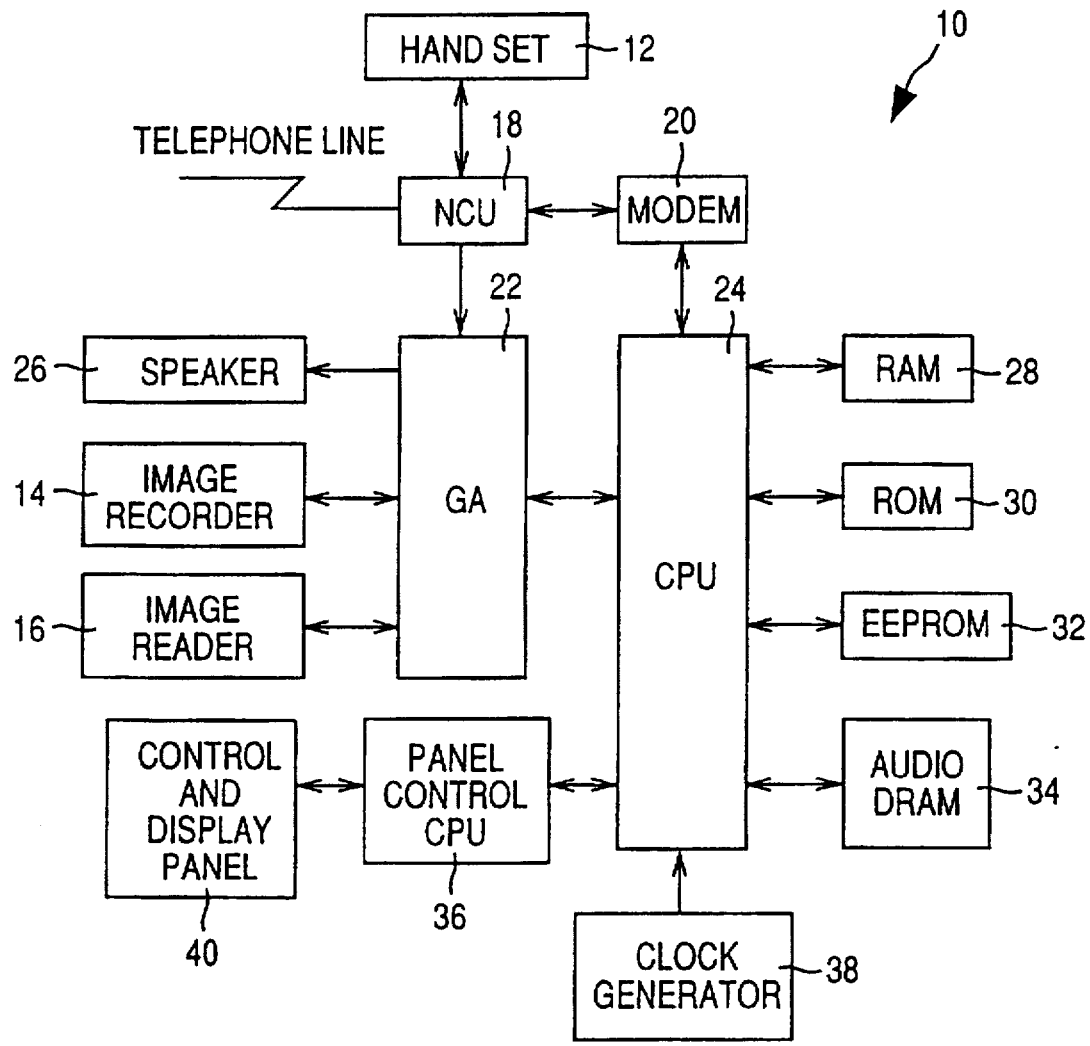
FIG. 1 is a block diagram showing a facsimile system of distinctive ringing type constructed according to one embodiment of the present invention.
Figures 11A, 11B, 11C, 11D:
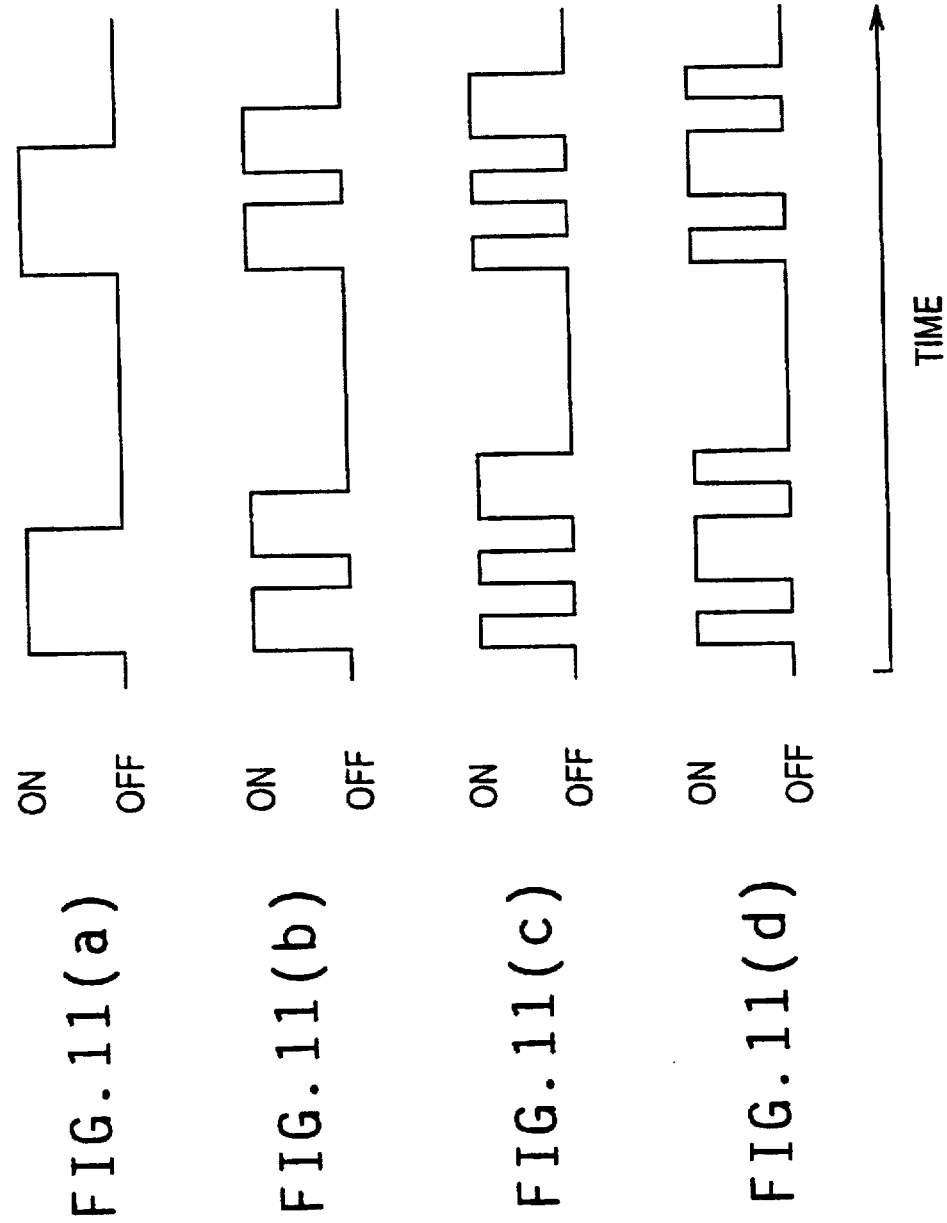
FIGS. 11A–11D are views showing examples of call signals having different patterns.
Figure 12:
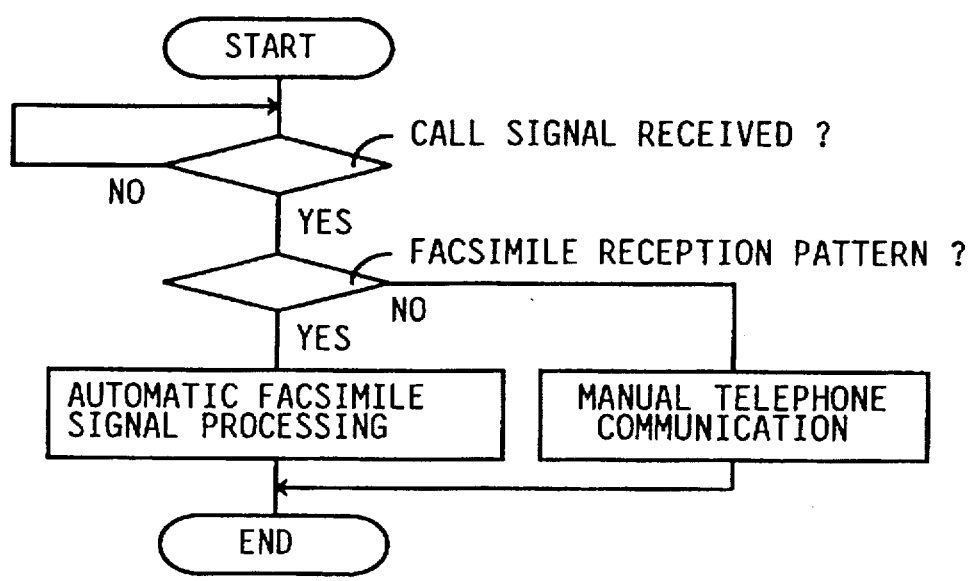
FIG. 12 is a flow chart illustrating a example of a signal processing routine in a known facsimile system of distinctive ringing type.

Referring first to the block diagram of FIG. 1, reference numeral 10 generally denotes a facsimile system constructed according to one embodiment of this invention. The facsimile system 10 is capable of performing telephone communication and facsimile communication with a remote facsimile system through a telephone line, more precisely, capable of transmitting and receiving a telephone or sound signal and a facsimile or picture signal to and from the remote facsimile system. The facsimile system 10 incorporates: a telephone hand set 12 for the telephone communication; an image recorder 14 including a printer for recording an image on a recording medium on the basis of a facsimile signal received from the remote facsimile transmitter; and an image reader 16 including a CCD (charge-coupled device) image sensor. A telephone line connected to a telephone exchange company is connected to a network control unit (NCU) 18. This NCU 18 is connected to the hand set 12, a MODEM for modulating and demodulating an facsimile signal (image or picture signal), and a gate array (GA) 22. The GA 22 incorporates various logic circuits for performing respective functions, including: activating a speaker 26 according to a drive signal received from a central processing unit (CPU) 24; controlling the image reader 16; and transferring image data from the image reader 16 to the CPU 24. The GA 22 receives from the telephone line a call signal CI (calling indicator) and various other signals through the NCU 18, so that the speaker 26 is operated to generate a ringing sound according to ON and OFF states of the received call signal CI as indicated in FIG. 11 by way of example. The GA 22 is also adapted to detect the frequency of the received signals.

To the CPU 24, there are connected through respective data bus lines the MODEM 20 and GA 22 described above, a random-access memory (RAM) 28, a read-only memory (ROM) 30, an electrically erasable programmable read-only memory (EEPROM) 32, an audio DRAM 34, a panel control CPU 36 and a clock generator 38. The CPU 24 operates according to control programs stored in the ROM 30 while utilizing a temporary data storage function of the RAM 28. The CPU 24 receives a clock signal having a predetermined frequency from the clock generator 38. The EEPROM 32 is capable of storing data such that the stored data are electrically erasable as needed. The EEPROM 32 has a memory area for storing pattern data representative of a predetermined pattern of a facsimile reception call signal CI which is assigned to call a telephone number exclusively used for receiving a facsimile signal from a remote facsimile transmitter of a calling party. The audio DRAM 34 is used in a telephone answering mode (hereinafter referred to as "TAD mode") which is selected when the facsimile system is not attended by the user. The audio DRAM 34 has a memory area for storing an outgoing message (OGM) to be transmitted to a remote telephone receiver, and a memory area for storing an incoming message (ICM) received from a remote telephone transmitter.

Figure 2:
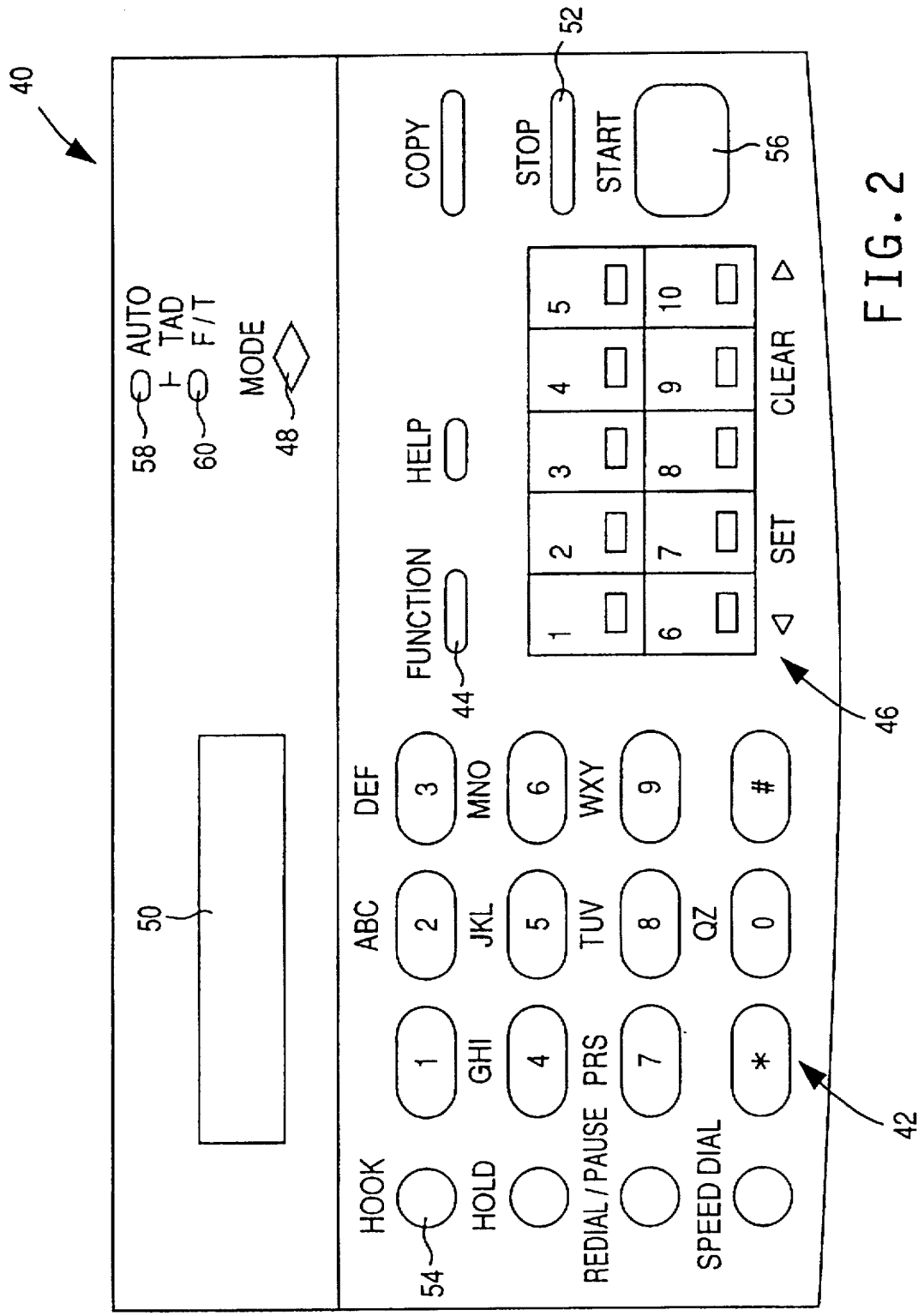
FIG. 2 is a view illustrating an operator's control and display panel provided in the facsimile system of FIG. 1.

The panel control CPU 36 is adapted to control an operator's control and display panel 40 according to signals from the CPU 24, and transmit output signals of the panel 40 to the CPU 24. An example of the panel 40 is illustrated in FIG. 2. In this example, the panel 40 includes: numeral and function keys 42 generally known as "TEN keys"; a FUNCTION key 44; SELECTOR keys 46; a MODE key 48; and a display 50 such as a liquid crystal display. The numeral and function keys 42 are used to enter data such as telephone numbers, and include ten numeral keys representative of numerals "0" through "9". The FUNCTION key 44 is used together with the SELECTOR keys 46, to achieve or change various functional settings as indicated in FIG. 3. As described below in detail with respect to the setting or selection of D/R modes, a functional setting is accomplished by first pressing the FUNCTION key 44 and then pressing appropriate ones of the SELECTOR keys 46 in a predetermined order.

In the present embodiment, a plurality of telephone numbers are used for the facsimile system 10 so that a distinctive ringing service (D/R service) by a telephone exchange company as described above in the BACKGROUND OF THE INVENTION is available in the facsimile system 10. Described more specifically, a call signal CI having a specific pattern (ON/OFF pattern as indicated in FIG. 11) is received to call each of the telephone numbers, and one of the call signals is assigned to call the telephone number which is exclusively used for the facsimile signal reception by the facsimile system 10. That is, the pattern of the facsimile reception call signal CI is registered as the facsimile reception pattern which calls the telephone number exclusively used for the facsimile signal reception. When a call signal CI is received by the facsimile system 10, the CPU 24 determines whether the pattern of the received call signal CI is the same as the registered facsimile reception pattern, so that a facsimile signal transmitted from a remote facsimile transmitter with the call signal CI is automatically received and processed for recording the corresponding image by the image recorder 14 if the pattern of the received call signal CI is the same as the registered facsimile reception pattern, as described below in detail.

For the facsimile system 10 to receive the D/R service, the facsimile reception pattern of the call signal CI must be registered while the system 10 is placed in a D/R SET mode as described below by reference to the flow chart of FIGS. 4 and 5. With the pattern of the facsimile reception call signal registered, the above-indicated automatic facsimile reception function is available when the system 10 is placed in a D/R ON mode (when an affirmative decision is obtained in step R2 of the flow chart of FIG. 7 as described below). When the system 10 is placed in a D/R OFF mode, the determination regarding the pattern of the received call signal CI is not effected.

Thus, there are three D/R modes: D/R ON mode; D/R OFF mode and D/R SET mode. To register the pattern of the facsimile reception call signal CI for utilizing the D/R service, the D/R SET mode must be selected. To select one of the D/R modes, a function setting mode must be selected by pressing the FUNCTION key 44. Then, the keys "6" and "7" of the SELECTOR keys 46 are pressed in this order, to select "6. TEL OPTION" of the MAIN ITEMS and "7. DISTINCTIVE" of the SUB-ITEMS in a function table illustrated in FIG. 3. With the keys "6" and "7" pressed, the display 50 provides an indication "7. DISTINCTIVE". In this condition, the key "7" labelled "SET" of the SELECTOR keys 46 is pressed, and the currently selected or established D/R mode is indicated on the display 50. That is, the displays 50 provides an indication "DISTINCTIVE: OFF", "DISTINCTIVE: ON" and "DISTINCTIVE: SET" when the D/R ON, D/R OFF and D/R SET modes are currently selected, respectively. The selected D/R mode is changed each time the key "6" or "10" of the SELECTOR keys 46 is pressed. The keys "6" and "10" are used as shift keys. When the key "7" labelled "SET" of the SELECTOR keys 46 is pressed when the desired D/R mode is indicated on the display 50, that D/R mode is selected or established as the effective D/R mode. However, the D/R ON mode cannot be displayed or selected unless the facsimile reception pattern of the call signal CI has been registered in the manner described below.

By pressing a STOP key 52 after pressing of the SET key "7" of the SELECTOR keys 46, the control goes out of the function setting mode and returns to a normal operation mode for telephone and facsimile reception and transmission. In the normal operation mode, the display 50 provides a predetermined indication, for example, indicates the current time when the D/R ON or D/R OFF mode is selected. However, the display 50 provides an indication "D/R SET MODE" when the D/R SET mode is currently selected. The RAM 28 stores data indicative of the currently selected D/R mode of the system 10.

The MODE key 48 is used to select one of reception modes of the facsimile system 10, namely, automatic facsimile reception mode (hereinafter referred to as "AUTO mode"), selective facsimile/telephone reception mode (hereinafter referred to as "F/T mode"), telephone answering mode (hereinafter referred to as "TAD mode") and manual reception mode (hereinafter referred to as "MANUAL mode"). These reception modes will be described later by reference to the flow charts of FIGS. 7–9. The currently selected reception mode is changed each time the MODE key 48 is pressed. When the AUTO mode is selected, a light emitting diode 58 is on. When the F/T mode is selected, a light emitting diode 60 is on. When the TAD mode is selected, the diodes 58, 60 are both on. When the MANUAL mode is selected, the diodes 58, 60 are both off. The RAM 28 also stores data indicative of the currently selected reception mode of the system 10.

Referring next to the flow charts of FIGS. 4–6, there will be described a routine which is executed by the CPU 24 to register the pattern of the facsimile reception pattern call signal CI corresponding to the telephone number exclusively used for facsimile signal reception. This routine can be executed only after the D/R SET mode is selected by using the FUNCTION key 44 and the SELECTOR keys 46 as described above. With the facsimile system 10 thus placed in the D/R SET mode, the call signal CI having a specific pattern to be registered is received from a telephone exchange company upon calling from a remote telephone or facsimile transmitter, for the purpose of registering the facsimile reception pattern of the call signal CI. As a result, an affirmative decision (YES) is obtained in the first step S1 of the pattern registering routine of FIGS. 4 and 5, and the control flow goes to step S2. Step S1 is repeatedly implemented until the call signal CI is received by the facsimile system 10. The call signals CI corresponding to the respective telephone numbers used by the facsimile system 10 have different patterns (ON-OFF patterns) as indicated at (a) through (d) in FIG. 11 by way of example. All of the call signals CI have a predetermined frequency in the ON state, and therefore each call signal CI received can be recognized as the call signal calling the appropriate telephone number.

When the call signal CI having the facsimile reception pattern corresponding to the telephone number used exclusively for the facsimile signal reception by the facsimile system 10 is received, step S2 is implemented to activate the display 50 to provide an indication "CALL SIGNAL RECEIVED", and activate the speaker 26 to generate a ringing sound corresponding to the pattern of the received call signal CI. Then, the control flow goes to step S3 to execute a sub-routine for detecting or analyzing the pattern of the received call signal CI.

Figure 5:
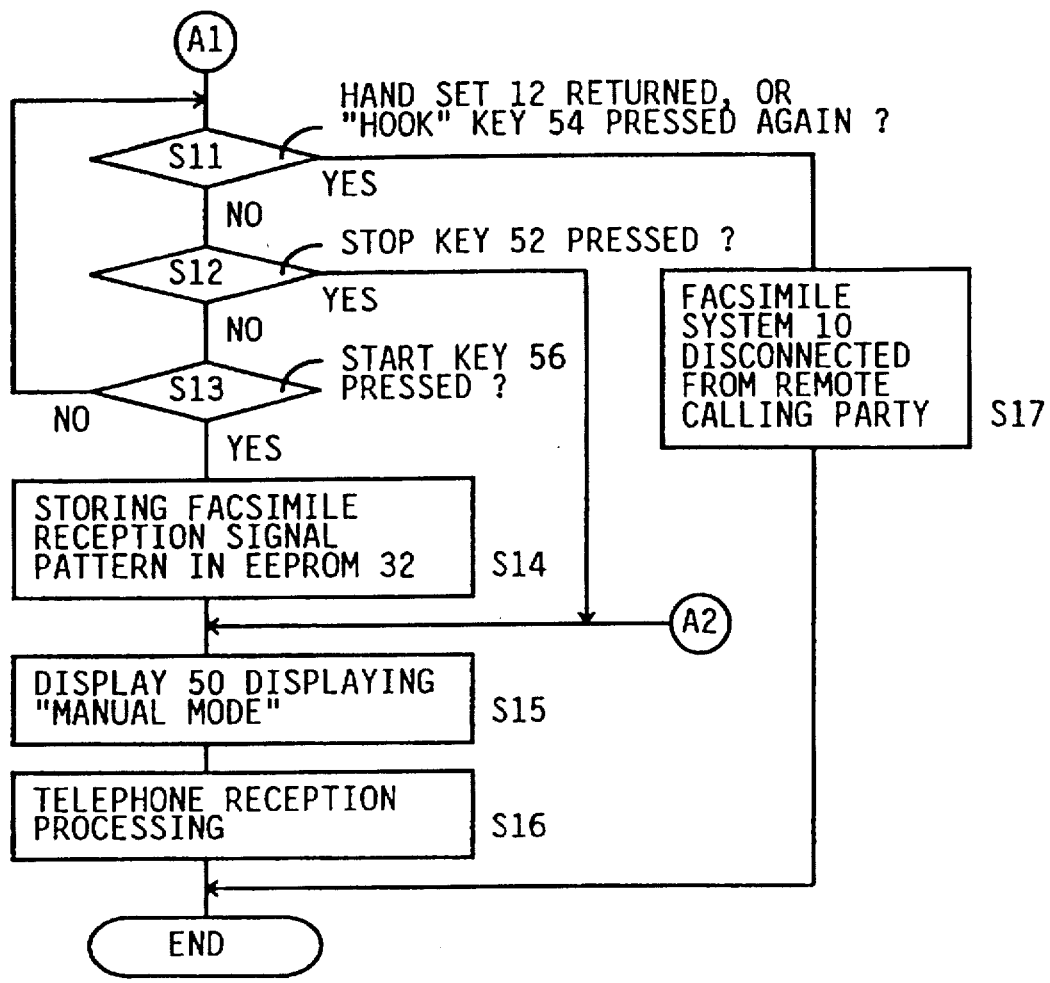
Figure 6:
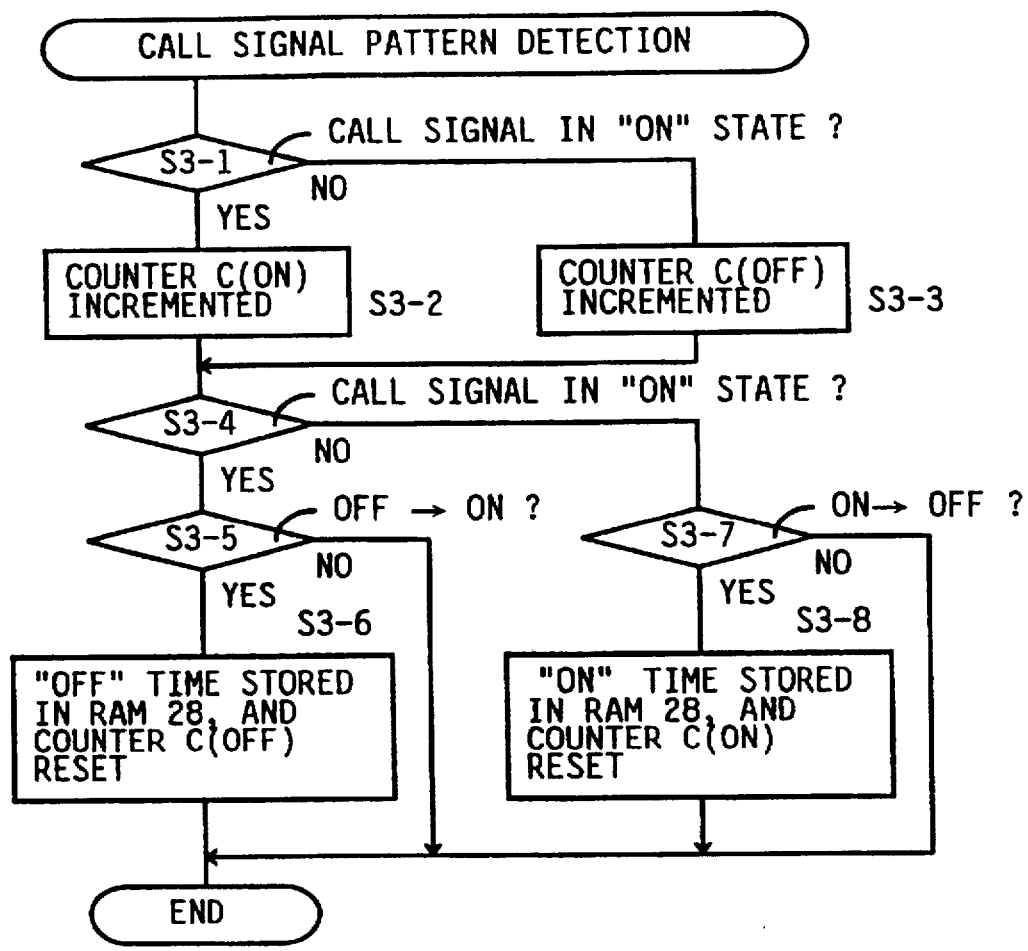
FIG. 6 is a flow chart illustrating a sub-routine executed in step S3 of the routine of FIGS. 4 and 5.

The sub-routine of step S3 is illustrated in the flow chart of FIG. 6. This sub-routine is initiated with step S3-1 to determine whether the call signal CI is in the ON state or not. This determination is made based on the frequency of the received call signal. If the call signal CI is in the ON state, step S3-2 is implemented to increment a counter C(ON). If the call signal CI is in the OFF state, step S3-3 is implemented to increment a counter C(OFF). These counters C(ON) and C(OFF) are both reset to zero before the routine of FIGS. 4–5 is executed, and also in steps S3-8 and S3-6, respectively. In the main routine of FIGS. 4–5, steps S3, S4 and S9 are repeatedly implemented at a predetermined cycle time until an affirmative decision (YES) is obtained in step S4 or S9. That is, the sub-routine of FIG. 6 is repeatedly executed at the predetermined cycle time, and the counter C(ON) or C(OFF) is selectively incremented each time the sub-routine S3-1 is repeatedly executed. Thus, the ON-time and OFF-time of the received call signal CI are measured in the form of the counts of the counters C(ON) and C(OFF). In other words, the contents of the counters C(ON) and C(OFF) represent the ON- and OFF-times of the call signal CI, namely, the pattern of the call signal CI.

Step S3-2 and S3-3 are followed by step S3-4 to determine again whether the call signal CI is in the ON state or not. The decision obtained in step S3-1 may be utilized in this step S3-4. If an affirmative decision (YES) is obtained, the control flow goes to step S3-5 to determine whether the state of the call signal CI has been just turned from OFF to ON, that is, is changed to ON in the present cycle of execution of the sub-routine of FIG. 6 (routine of FIGS. 4 and 5). This determination is made on the basis of the content of a flag indicating the state of the call signal CI in the last cycle. If an affirmative decision (YES) is obtained in step S3-5, step S3-6 is implemented to store in the RAM 28 data representative of the content or count of the counter C(OFF), that is, the OFF time of the call signal CI, and then reset the counter C(OFF) to zero. If a negative decision (NO) is obtained in step S3-5, that is, if the call signal CI remains ON, the sub-routine of FIG. 6 is terminated, and the control flow goes to step S4 of the main routine. If a negative decision (NO) is obtained in step S3-4, that is, if the state of the call signal CI is currently OFF, the control flow goes to step S3-7 to determine whether the state of the call signal CI has been just turned from ON to OFF, that is, is changed to OFF in the present cycle. This determination is also made on the basis of the flag indicating the state of the call signal in the last cycle. If an affirmative decision (YES) is obtained in step S3-7, step S3-8 is implemented to store in the RAM 28 data representative of the content or count of the counter C(ON), that is, the ON time of the call signal CI, and then reset the counter C(ON) to zero. If a negative decision (NO) is obtained in step S3-8, namely, if the call signal CI remains OFF, the sub-routine of FIG. 6 is terminated, and the control flow goes to step S4 of the main routine.

Step S3 described above by reference to FIG. 6 is followed by step S4 to determine whether the two periods of the call signal CI have been analyzed. If an affirmative decision (YES) is obtained in step S4, the control flow goes to step S5. If a negative decision (NO) is obtained in step S4, the control flow goes to step S9. The determination in step S4 is made by checking if the RAM 28 has stored the data representative of two occurrences of an ON-OFF pattern consisting of the alternate ON- and OFF-times (states) as indicated at (a)–(d) in FIG. 11. However, the determination may be made by checking if two long OFF states of the call signal CI have been detected. In this respect, it is noted that all the call signal CI have one comparatively long OFF state time. If a negative decision (NO) is obtained in step S4, the control flow goes to step S9 to determine whether the telephone hand set 12 has been picked up or a HOOK key 54 on the panel 40 has been pressed. The hand set 12 may be picked up by the user or the HOOK key 54 may be pressed by the user if the user does not recognize that the facsimile system 10 is now placed in the D/R SET mode. If a negative decision (NO) is obtained in step S9, the control flow goes back to step S3. If the hand set 12 has been picked up or the HOOK key 54 is turned ON by mistake by the user, step S10 is implemented to turn off the speaker 26, and connect the facsimile system 10 of the called party to a remote facsimile system as the calling party through the telephone line. Step S10 is followed by step S15 (FIG. 5).

In step S5 which is implemented if the affirmative decision (YES) is obtained in step S4, the display 50 provides a message "PICK UP HAND SET 12 TO REGISTER FACSIMILE RECEPTION CALL SIGNAL PATTERN". Step S5 is followed by step S6 to determine whether the hand set 12 has been picked up or the HOOK key 54 has been pressed. If an affirmative decision (YES) is obtained in step S6, the control flow goes to step S7 to turn off the speaker 26 and connect the facsimile system 10 to the remote facsimile system through the telephone line. Then, step S8 is implemented to activate the display 50 to provide a display "REGISTER FACSIMILE RECEPTION SIGNAL PATTERN". Step S8 is followed by step S11 (FIG. 5) to determine whether the hand set 12 has been returned in place or the HOOK key 54 has been pressed again by mistake by the user. If an affirmative decision (YES) is obtained in step S11, the control flow goes to step S17 to disconnect the facsimile system 10 from the remote facsimile system, and one cycle of execution of the routine is terminated. If a negative decision (NO) is obtained in step S11, the control flow goes to step S12 to determine whether the STOP key 52 has been pressed. If the key 52 is on, step S12 is followed by step S15. The STOP key 52 is used to cancel the registration of the pattern of the call signal CI as detected or analyzed in step S3, for some reason or other. For instance, the user presses the STOP key 52 if the user finds that the ringing sound generated by the speaker 26 in step S2 is different from that of the call signal assigned to call the telephone number exclusively used for the facsimile signal reception, namely, the call signal CI received calls the telephone number which is not exclusively used for the facsimile signal reception. If a negative decision (NO) is obtained in step S12, the control flow goes to step S13 to determine whether a START key 56 has been pressed. Steps S11–S13 are repeatedly implemented until an affirmative decision (YES) is obtained in any one of these steps. If an affirmative decision is obtained in step S13, step S14 is implemented to store in the EEPROM 32 the pattern of the call signal CI as detected in step S3, more precisely, the ON and OFF times corresponding to one period of the call signal CI, which are stored in the RAM 28. This pattern is stored as the pattern of the facsimile reception call signal CI assigned to call the telephone number exclusively used for the facsimile signal reception. With step S14 completed, the D/R mode of the facsimile system 10 is automatically changed from the D/R SET mode to the D/R ON mode.

Step S14 is followed by step S15 to activate the display 50 to provide an indication "MANUAL MODE", and step S16 to permit telephone communication with the remote party calling the appropriate telephone number, without activating the speaker 26. In this respect, it is noted that the hand set 12 has already been picked up or the HOOK key 54 has already been pressed in step S6. In this MANUAL reception mode, the facsimile system 10 may receive and process a facsimile signal from the remote facsimile transmitter, if the START key 56 is pressed, as described later with respect to step R11 of FIG. 7.

Figure 7:
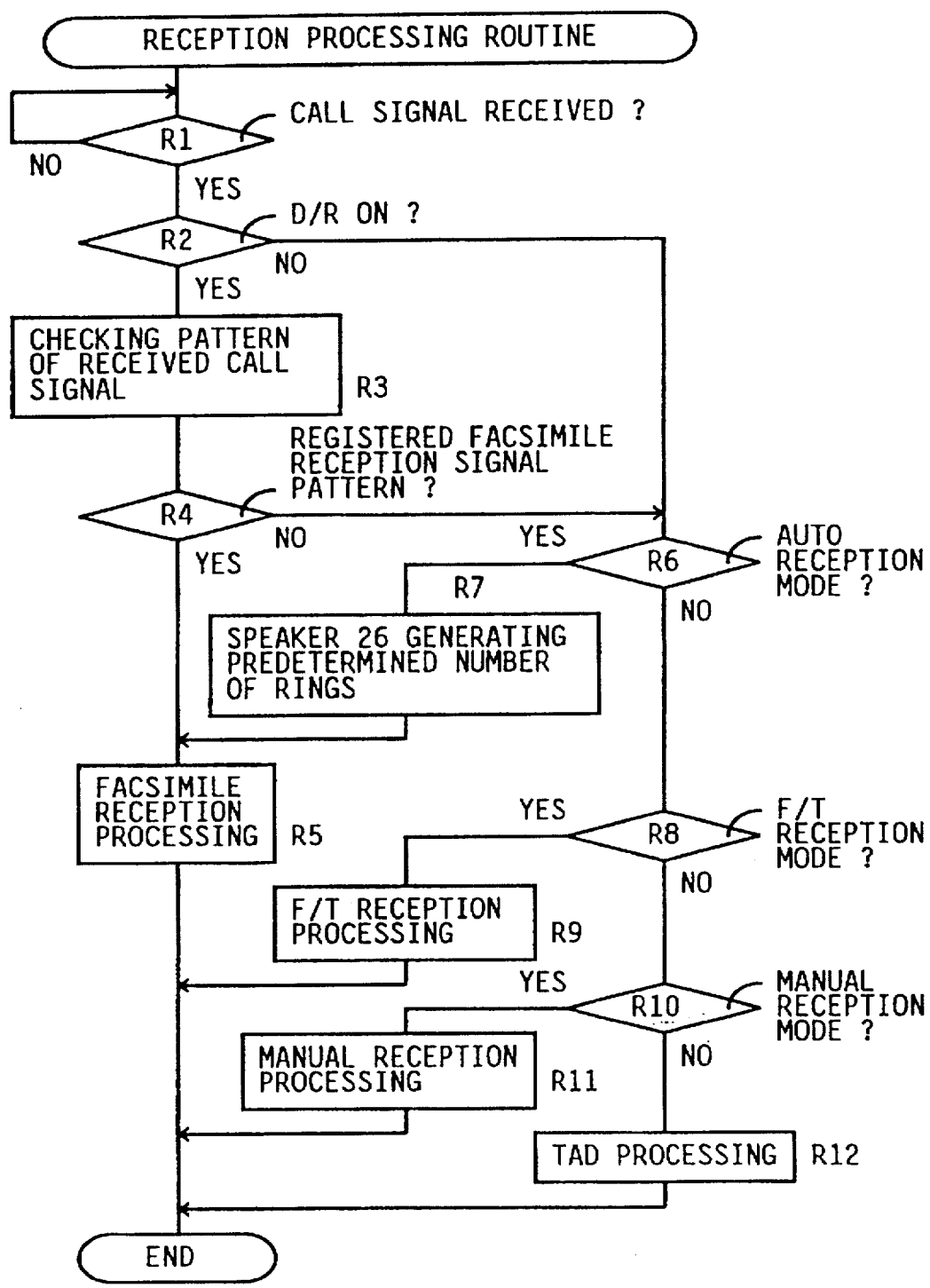
FIG. 7 is a flow chart illustrating a routine executed upon reception of a call signal.

When the facsimile system 10 is placed in the D/R ON mode or D/R OFF mode (and in one of the four reception modes (AUTO, F/T, TAD and MANUAL), a reception processing routine of FIG. 7 is executed to process the received call signal CI and a facsimile or telephone signal. The routine of FIG. 7 is initiated with step R1 to determine whether the call signal CI has been received, as in step S1 of the routine of FIGS. 4–5. If an affirmative decision (YES) is obtained in step R1, the control flow goes to step R2 to determine whether the facsimile system 10 is placed in the D/R ON more. This determination is made on the basis of the data stored in the RAM 28, which represent the currently selected D/R mode. If the D/R ON mode is currently selected, step R3 is implemented. If the D/R ON mode is not selected, that is, if the D/R OFF mode is selected, the control flow goes to step R6.

Figure 8:
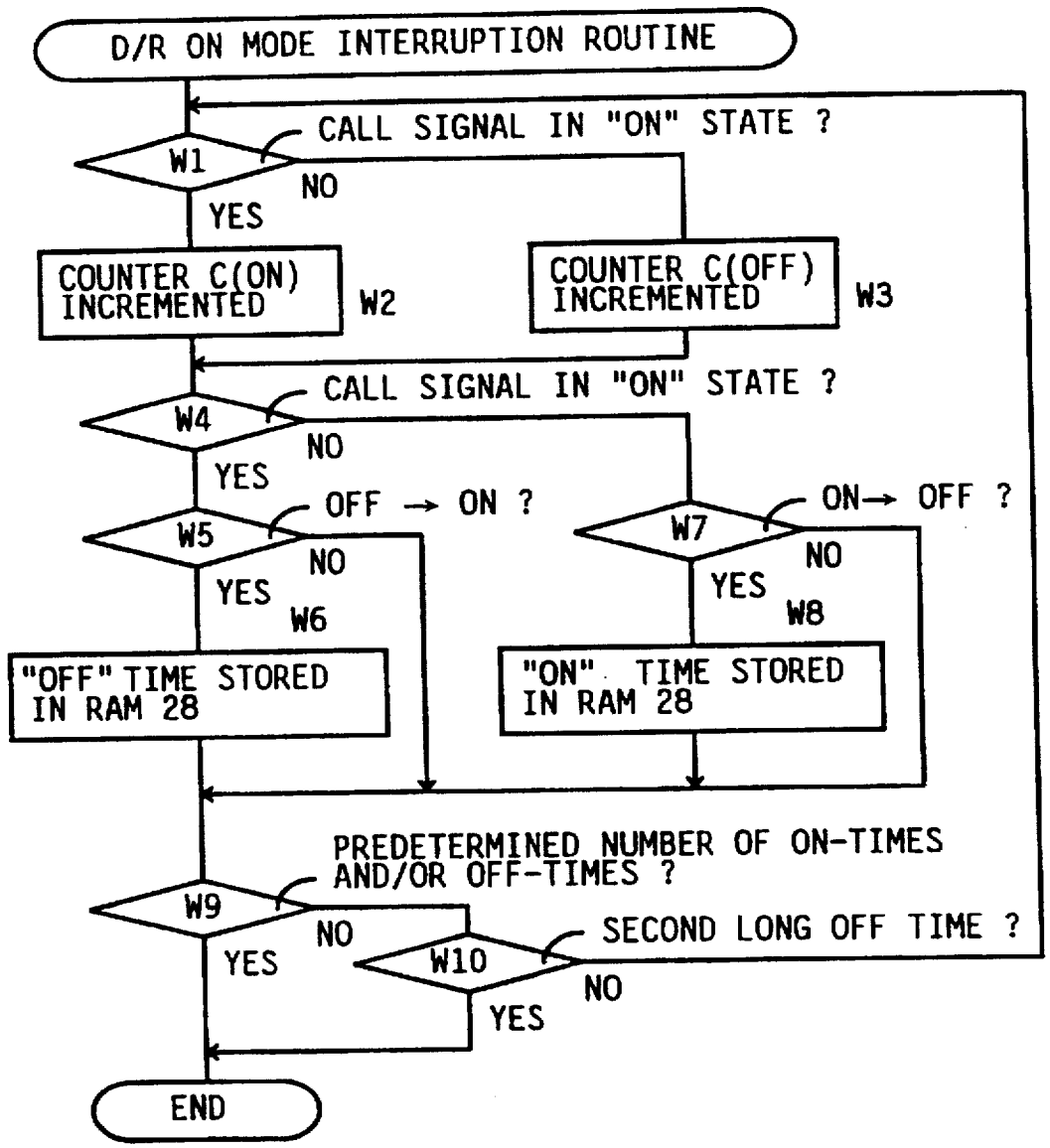
FIG. 8 is a flow chart illustrating an interruption routine executed when the facsimile system is placed in a D/R ON mode.

If the D/R ON mode is currently selected, a D/R ON mode interruption routine of FIG. 8 is executed. This interruption routine includes steps W1 through W8 which are identical with steps S3-1 through S3-8 of the sub-routine of FIG. 6, so that the OFF and ON-times of the received call signal CI as represented by the contents of the counters C(OFF) and C(ON) are stored in the RAM 28, in steps W6 and W8. Steps W6 and W8 are followed by step W9 to determine whether the number of the stored ON times or OFF-times or the total number of the stored ON- and OFF-times is equal to a predetermined number, namely, equal to the number of the ON times and/or OFF-times of the pattern of the facsimile reception call signal as represented by the data stored in the EEPROM 32 in step S14 (FIG. 5). If an affirmative decision (YES) is obtained in step W9, the present interruption routine is terminated, and the control goes to step R3 of the reception routine.

The call signal indicated at (a) in FIG. 11 has one ON-time and one OFF-time (long OFF-time). The call signal indicated at (b) in FIG. 11 has two ON-times and two OFF-times (including one long OFF-time), while the call signals indicated at (c) and (d) in FIG. 11 have three ON-times and three OFF-times (including one long OFF-time). If the signal pattern indicated at (a) is registered (by the routine of FIGS. 5–6) as the facsimile reception pattern, an affirmative decision (YES) is obtained in step W9 when only one ON-time, only one OFF-time or only one ON-time and only one OFF-time has/have been detected. If the affirmative decision (YES) is obtained in step W9, the control flow goes to step R3. If a negative decision (NO) is obtained in step W9, step W10 is implemented to determine whether the second long OFF-time has been detected. The affirmative decision (YES) should be obtained in step W9 before the two long OFF-times have been detected. In other words, the affirmative decision (YES) is usually obtained in step W9 before an affirmative decision (YES) is obtained in step W10. If the affirmative decision is obtained in step W10 before the affirmative decision is obtained in step W9, this means that the pattern of the call signal received is not the registered facsimile reception pattern. In this case, a negative decision (NO) is obtained in step R4, without implementing step R3.

The interruption routine of FIG. 8 is followed by step R3 of the reception processing routine of FIG. 7 wherein the OFF- and ON-times stored in the RAM 28 in steps W6 and W8 are compared with the OFF- and ON-times stored in the EEPROM 32, that is, the OFF- and ON-times of the registered facsimile reception pattern. If two or more ON-times or OFF-times are stored in the EEPROM 32, the comparison is made for each of those ON- or OFF-times. If the ON- and OFF-times in the RAM 28 have the same pattern as that of the ON- and OFF-times stored in the EEPROM 32, an affirmative decision (YES) is obtained in step R4. However, the determination in step R4 may be made without checking all of the ON-times or OFF-times or ON- and OFF-times have been checked for coincidence with those of the registered pattern, since the different call signals have different combinations of ON- and OFF-times. If the affirmative decision (YES) is obtained in step R4, the control flow goes to step R5 for automatic reception and processing of a facsimile signal if received from the remote facsimile transmitter, irrespective of the currently selected reception mode, so that an image is recorded on the recording medium by the image recorder 14 according to the processed facsimile signal.

The present embodiment is characterized by the provision of step R4, and steps which are implemented if a negative decision (NO) is obtained in step R4. If the negative decision (NO) is obtained in step R4, the control flow goes to step R6 to determine whether the facsimile system 10 is now placed in the AUTO reception mode. This determination is made on the basis of the data stored in the RAM 28, which represent the currently selected reception mode. If an affirmative decision (YES) is obtained in step R6, step R7 is implemented to activate the speaker 26 to generate a predetermined number of ringing sounds, and then step R5 is implemented to automatically receive and process the facsimile signal as described above. If the hand set 12 is picked up or the HOOK key 54 is pressed by the user after the ringing sounds are generated in step R7, step similar to step S16 of the routine of FIGS. 4–5 is implemented for permitting telephone communication with a remote telephone transmitter/receiver. This aspect is not shown in the flow chart of FIG. 7. If a negative decision (NO) is obtained in step R6, the control flow goes to step R8 to determine whether the facsimile system 10 is placed in the F/T reception mode. If an affirmative decision (YES) is obtained in step R8, a F/T reception processing sub-routine is executed in step R9 as illustrated in the flow chart of FIG. 9.

The sub-routine of FIG. 9 is initiated with step R9-1 to connect the facsimile system 10 of the called party to the remote facsimile system of the calling party. Step R9-1 is followed by step R9-2 to reset a timer Ta to zero. Then, step R9-3 is implemented to determine whether the hand set 12 has been picked up or the HOOK key 54 has been pressed. If an affirmative decision (YES) is obtained in step R9-3, the control flow goes to step R9-10 similar to step S16. If a negative decision (NO) is obtained in step R9-3, the control flow goes to step R9-4 to determine whether the GA 22 has received a facsimile signal transmission signal CGN indicating that a facsimile signal will be transmitted from the remote facsimile transmitter, or a facsimile signal processing signal requesting the processing of the facsimile signal at the called party (facsimile system 10). If an affirmative decision (YES) is obtained in step R9-4, then the control flow goes to step R9-9 similar to step R5, for automatically receiving and processing a facsimile signal if received. If a negative decision (NO) is obtained in step R9-4, step R9-5 is implemented to determine whether the content of the timer Ta is equal to or larger than a predetermined threshold "ta". steps R9-3 through R9-5 are repeatedly implemented until an affirmative decision (YES) is obtained in any of these steps. If the affirmative decision is obtained in step R9-5, the control flow goes to step R9-6 to turn on the speaker 26 to generate a ringing sound, and then to step R9-7 to determine whether the content of the timer Ta is equal to or larger than a threshold "tb1", which is longer than the threshold "ta". Steps R9-3 through R9-7 are repeatedly implemented until an affirmative decision (YES) is obtained in step R9-7. When the affirmative decision is obtained in step R9-7, step R9-8 is implemented to turn off the speaker 26, and then step R9-9 similar to step R5 is implemented so that the facsimile signal received is processed for recording by the image recorder 14. The threshold "tb1" may be a predetermined fixed time, or may be changed by the user through the control and display panel 40.

Referring back to the reception processing routine of FIG. 7, the control flow goes to step R10 if a negative decision (NO) is obtained in step R8. Step R10 is provided to determine whether the facsimile system 10 is now placed in the MANUAL reception mode. If the MANUAL reception mode is selected, step R11 is implemented to effect manual reception processing, which includes activation of the speaker 26 to generate a ringing sound corresponding to the pattern of the call signal CI (which is not the registered facsimile reception pattern). According to this manual reception processing, the speaker 26 is turned off and telephone communication with a remote telephone transmitter/receiver is permitted if the hand set 12 is picked up or the HOOK key 54 is pressed. If the START key 56 is pressed, a facsimile signal if received is processed for recording.

If a negative decision (NO) is obtained in step R10, this means that the facsimile system 10 is placed in the TAD reception mode, which is usually selected when the system 10 is left unattended by the user. That is, the system 10 incorporates an automatic telephone answering device, and the audio DRAM 34, which are used when the system 10 is placed in the TAD reception mode. In this mode, a TAD processing sub-routine of step R12 is executed following step R10. This sub-routine, which is illustrated in the flow chart of FIG. 10, includes steps R12-1 through R12-8 and steps R12-11 and R12-12, which are identical with steps R9-1 through R9-8 and steps R9-9 and R9-10 of the sub-routine of FIG. 9, respectively, except for a threshold "tb2" used in step R12-7. The threshold "tb2" is different from the threshold "ta1" used in step R9-7, and may be either a fixed value or a variable selected by the user through the panel 40. Step R12-8 is followed by steps R12-9 and R12-10, which are followed by step R12-11 corresponding to step R9-9. In step R12-9, an outgoing message stored in the audio DRAM 34 is transmitted to the remote telephone receiver. In step R12-10, an incoming message received from the remote telephone transmitter is stored in the audio DRAM 34. The operation in step R12-10 is performed for a predetermined length of time. Then, the control flow goes to step R12-11 for automatically receiving and processing a facsimile signal if received from the remote facsimile transmitter.

When the facsimile system 10 is placed in the D/R OFF mode, steps R6-R12 are implemented depending upon the currently selected reception mode.

It will be understood from the foregoing explanation that the present facsimile system 10 is adapted to implement step R5 for automatic reception and processing of a facsimile signal from a remote facsimile transmitter if the pattern of the call signal CI received is the same as the registered facsimile reception pattern. It is important to note that step R5, or step R9-9 or R12-11 similar to step R5 is also implemented for automatic reception and processing of the received facsimile signal, even if the pattern of the received call signal CI is not the same as the registered facsimile reception pattern. Described more specifically, even if the received call signal CI does not have the registered facsimile reception pattern, the facsimile signal is automatically processed for recording by the image recorder 14 in the following five cases, namely, when one of the following conditions is satisfied:

(1) when the facsimile system 10 is placed in the AUTO reception mode (when the affirmative decision is obtained in step R6 implemented following step R4);

(2) when the facsimile system 10 is placed in the F/T reception mode (when the affirmative decision is obtained in step R8) and when the facsimile signal transmission signal CNG (calling tone signal) or facsimile signal processing signal ID is received (when the affirmative decision is obtained in step R9-4);

(3) when the facsimile system 10 is placed in the F/T reception mode and when the hand set 12 has not been picked up and the HOOK key 54 has not been pressed, for more than a predetermined time (when the affirmative decision is obtained in step R9-7);

(4) when the facsimile system 10 is placed in the TAD reception mode (when the negative decision is obtained in step R10) and when the facsimile signal transmission signal CNG or facsimile signal processing signal ID is received (when the affirmative decision is obtained in step R12-4); and (5) when the facsimile system 10 is placed in the TAD reception mode and when the hand set 12 has not been picked up and the HOOK key 54 has not been pressed, for more than a predetermined time (when the affirmative decision is obtained in step R12-7).

As described above, the present facsimile system 10 is adapted such that the received facsimile signal is automatically processed for recording of the corresponding image by the image recorder 14 when one of the above-indicated conditions is satisfied, even if the received call signal CI does not have the registered facsimile reception pattern. This arrangement is advantageous when the present facsimile system 10 is newly installed to receive the distinctive ringing service with a new telephone number assigned to exclusively receive the facsimile signal. In this case, the pattern of the call signal CI calling that new telephone number is registered as the facsimile reception pattern in the EEPROM 32, so that the facsimile signal received with the call signal CI having the registered facsimile reception pattern is automatically processed for image recording, and so that the received facsimile signal is automatically processed when one of the above-indicated conditions is satisfied even if the pattern of the call signal CI is not the registered facsimile reception pattern. This arrangement permits automatic reception and processing of the facsimile signal received with the call signal CI calling the telephone number not assigned to receive the facsimile signal, in the above-indicated cases, while the facsimile system 10 is not attended by the user.

In the present embodiment, the portions of the CPU 24, RAM 28 and ROM 30 assigned to implement steps R3 and R4 of FIG. 7 and steps W1-W10 of FIG. 8 constitute pattern determining means for determining whether the received call signal CI has the facsimile reception pattern registered in the EEPROM 32. Further, the portions of the CPU 24, RAM 28 and ROM 30 assigned to implement steps R4 and R5 constitute facsimile receiving means for automatically processing a facsimile signal received from the calling party, for image recording according to the facsimile signal, if the pattern determining means determines that the received call signal has the facsimile reception pattern. It is also noted that conditional facsimile reception means is provided by the portions of the CPU 24, RAM 28 and ROM 30 assigned to implement: steps R4, R6, R7 and R5 implemented following step R7; steps R8, R9-2, R9-4, R9-7 and R9-9; and steps R10, R12-2, R12-4, R12-7 and R12-11. The conditional facsimile reception means is responsive to the pattern determining means, for automatically processing the facsimile signal if the pattern determining means determines that the call signal received from the calling party does not have the facsimile reception signal and if one of predetermined conditions is satisfied. The predetermined conditions consist of the five conditions (1) through (5) indicated above. It is further noted that the portions of the CPU 24, RAM 28 and ROM 30 assigned to execute the routine of FIGS. 4-6 and the EEPROM 32 constitute pattern registering means for storing, as the facsimile reception pattern, the pattern of one of the call signals which is assigned to call one of the telephone numbers that is exclusively used to receive the facsimile signal from the remote calling party.

The present facsimile system 10 may be easily placed in the D/R SET mode by using the FUNCTION key 44 and the SELECTOR keys 46, when the pattern of the call signal CI calling the telephone number assigned to receive the facsimile signal is registered as the facsimile reception pattern in a pattern data memory in the form of the EEPROM 32. In this case, the call signal CI having that facsimile reception pattern to be registered is sent from a telephone exchange company in response to a call from a remote telephone or facsimile transmitter.

While the present invention has been described in detail in its presently preferred embodiment, it is to be understood that the invention may be otherwise embodied.

In the illustrated embodiment, the D/R ON mode and D/R OFF mode are both available after the facsimile reception pattern of the call signal CI is registered in the D/R SET mode. However, it is possible that only the D/R ON mode is available once the facsimile reception pattern of the call signal is registered. Although the illustrated embodiment uses three conditional facsimile reception modes (AUTO, F/T and TAD) in which the facsimile signal is automatically received and processed when the particular condition is satisfied as described above even if the received call signal does not have the registered facsimile reception pattern. However, at least one of the AUTO, F/T and TAD modes may be provided. Further, conditional automatic facsimile reception modes other than the AUTO, F/T and TAD modes may be provided. The details of the routine of FIG. 7 and the sub-routines of FIGS. 9 and 10 relating to such conditional automatic facsimile reception modes may be modified as needed.

As described above, the present embodiment uses five conditions for the conditional facsimile signal reception where the received call signal does not call the telephone number assigned to receive the facsimile signal. However, these conditions may be changed or modified, or some of these conditions may be eliminated, or other conditions may be added. For instance, where the facsimile system 10 does not have the TAD reception mode, step R10 of FIG. 7 and the sub-routine of FIG. 10 are eliminated.

Figure 4:
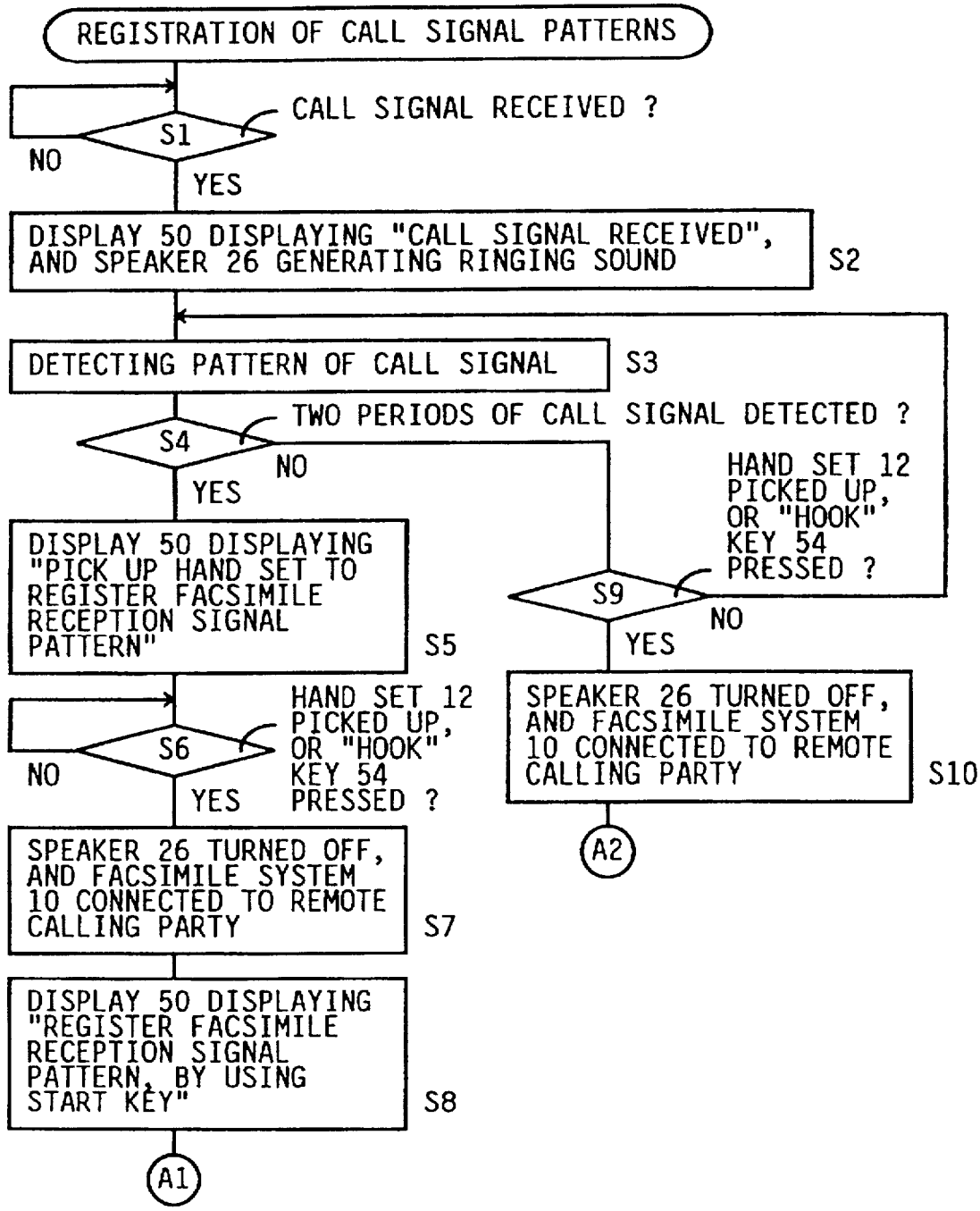
FIGS. 4 and 5 are flow charts illustrating a routine for registering the pattern of a facsimile reception call signal for facsimile reception in the facsimile system of FIG. 1.

Although the routine of FIG. 4 to register the facsimile reception pattern of the call signal is adapted to require the user to pick up the hand set 12 or press the HOOK key 54 and press the START key 56, the routine of FIG. 4 may be suitably modified. For example, the registration may be effected without any key operation or by using a single key. Further, the routine of FIG. 4 may be replaced by other routines. For instance, the various patterns of call signals CI corresponding to the telephone numbers used for the facsimile system in question are stored in a suitable memory, and the call signal calling the telephone number assigned to receive the facsimile signal is received from the telephone exchange company, so that the user selects one of the stored patterns as the facsimile reception pattern, by recognizing the pattern of the received call signal while listening to the type of ringing which corresponds to that pattern to be registered as the facsimile reception pattern.

In the illustrated embodiment, the ON- and OFF-times of the call signal are measured to register the pattern of the signal by using the counters C(ON) and C(OFF). However, the ON- and OFF-times may be measured by using the clock pulses generated by the clock generator 38.

While the illustrated embodiment uses the routine of FIGS. 4–5 for registering the facsimile reception pattern of the call signal and the separate reception processing routine of FIG. 7, these routines may be integrated into a single routine, which may be formulated such that the determination as to whether the D/R OFF mode is selected is effected following step S1, and steps S3, S4 and S9 are repeatedly implemented to detect the pattern of the received call signal CI if the D/R OFF mode is not selected, and such that steps S5–S16 are implemented to register the facsimile reception pattern if the D/R SET mode is selected, or steps R3–R12 are implemented for effecting reception processing if the D/R ON mode is selected.

Although the FUNCTION key 44 and the SELECTOR keys 46 are used to change the D/R mode (selected one of the D/R ON, D/R OFF and D/R SET mode), a single key may be used to select one of the D/R modes, like the MODE key 48 is used to select one of the reception modes (AUTO, F/T, MANUAL and TAD).

In the routine of FIGS. 4 and 5, the pattern of the call signal stored in the RAM 28 is stored as the facsimile reception pattern in the EEPROM 32 (step S14) immediately after the START key 56 is pressed (step S13). If any pattern has already been stored in the EEPROM 32, the new pattern stored in the RAM 28 is substituted for the pattern already stored in the EEPROM 32. However, step S14 may be preceded by a step to ask the user as to whether the already stored pattern should be replaced by the new pattern, or a step to inform the user by an alarm sound or voice message that the facsimile reception pattern is already stored in the EEPROM 32, and a step in which the START key 56 or other key is pressed to replace the old pattern by the new pattern.

It is to be understood that the present invention may be embodied with various other changes, modifications and improvements, which may occur to those skilled in the art without departing from the spirit and scope of the invention defined in the following claims.

What is claimed is:

1. A facsimile system of distinctive ringing type of a called party capable of effecting selective telephone and facsimile communications with a remote calling party calling one of a plurality of telephone numbers used by the facsimile system of said called party, said plurality of telephone numbers being called by respective call signals which are received from said remote calling party and which have respective different patterns, said facsimile system comprising:

pattern registering means for registering, as a facsimile reception pattern, the pattern of one of said call signals which is assigned to call one of said telephone numbers that is exclusively used to receive a facsimile signal from said remote calling party;

pattern determining means for determining whether a call signal which has been received by the facsimile system of said called party has said facsimile reception pattern registered by said pattern registering means;

facsimile receiving means, responsive to said pattern determining means, for automatically processing said facsimile signal for recording of an image represented by said facsimile signal, if said pattern determining means determines that said received call signal has said facsimile reception pattern; and conditional facsimile reception means, responsive to said pattern determining means, for automatically processing said facsimile signal for recording of said image, if said pattern determining means determines that said received call signal does not have said facsimile reception pattern and if one of at least one predetermined condition is satisfied.

2. A facsimile system of distinctive ringing type according to claim 1, wherein said conditional facsimile reception means comprises condition determining means for determining if one of said at least one predetermined condition is satisfied.

3. A facsimile system of distinctive ringing type according to claim 2, wherein said at least one predetermined condition includes a condition that said facsimile system is placed in an automatic facsimile reception mode, and wherein said condition determining means determines whether said facsimile system is placed in said automatic facsimile reception mode, said conditional facsimile reception means processing said facsimile signal which is received following the call signal not having said facsimile reception pattern, if said condition determining means determines that said facsimile system is placed in said automatic facsimile reception mode.

4. A facsimile system of distinctive ringing type according to claim 2, wherein said at least one predetermined condition includes a condition that a predetermined time has passed after reception of said received call signal while said facsimile system is placed in a selective facsimile/telephone reception mode, and wherein said condition determining means determines whether said facsimile system is placed in said selective facsimile/telephone reception mode and whether said predetermined time has passed after reception of said received call signal, said conditional facsimile reception means processing said facsimile signal which is received following the received call signal, if said condition determining means determines that said facsimile system is placed in said selective facsimile/telephone reception mode and that said predetermined time has passed after reception of said received call signal.

5. A facsimile system of distinctive ringing type according to claim 2, wherein said at least one predetermined condition includes a condition that a predetermined signal is received following said received call signal while said facsimile system is placed in a selective facsimile/telephone reception mode, and wherein said condition determining means determines whether said facsimile system is placed in said selective facsimile/telephone reception mode and whether said predetermined signal is received following said received call signal, said conditional facsimile reception means processing said facsimile signal which is received following the received call signal, if said condition determining means determines that said facsimile system is placed in said selective facsimile/telephone reception mode and that said predetermined signal is received following said received call signal.

6. A facsimile system of distinctive ringing type according to claim 5, wherein said predetermined signal is a signal indicating that the facsimile signal will be transmitted from said remote calling party to said called party.

7. A facsimile system of distinctive ringing type according to claim 5, wherein said predetermined signal is a facsimile signal processing signal which requests said called party to process the facsimile signal.

8. A facsimile system of distinctive ringing type according to claim 2, wherein said at least one predetermined condition includes a condition that a predetermined time has passed after reception of said received call signal while said facsimile system is placed in a telephone answering mode, and wherein said condition determining means determines whether said facsimile system is placed in said telephone answering mode, and whether said predetermined time has passed after reception of said received call signal, said conditional facsimile reception means processing said facsimile signal which is received following the received call signal, if said condition determining means determines that said facsimile system is placed in said telephone answering mode and that said predetermined time has passed after reception of said received call signal.

9. A facsimile system of distinctive ringing type according to claim 2, wherein said at least one predetermined condition includes a condition that a predetermined signal is received following said received call signal while said facsimile system is placed in a telephone answering mode, and wherein said condition determining means determines whether said facsimile system is placed in said telephone answering mode and whether said predetermined signal is received following said received call signal, said conditional facsimile reception means processing said facsimile signal which is received following the received call, if said condition determining means determines that said facsimile system is placed in said telephone answering mode and that said predetermined signal is received following said received call signal.

10. A facsimile system of distinctive ringing type according to claim 9, wherein said predetermined signal is a signal indicating that the facsimile signal will be transmitted from said remote calling party to said called party.

11. A facsimile system of distinctive ringing type according to claim 9, wherein said predetermined signal is a facsimile signal processing signal which requests said called party to process the facsimile signal at said called party.

12. A facsimile system of distinctive ringing type according to claim 9, further comprising means for storing a telephone message received from said remote calling party following said received call signal, if said condition determining means determines that said facsimile system is placed in said telephone answering mode and that said predetermined time has passed after reception of said received call signal.

13. A facsimile system of distinctive ringing type according to claim 1, wherein said pattern registering means comprises a pattern data memory for storing pattern data representative of said facsimile reception pattern of a call signal calling the telephone number exclusively used to receive the facsimile signal.

14. A facsimile system of distinctive ringing type according to claim 13, wherein said pattern registering means comprises means for establishing a set mode in which said pattern data are stored in said pattern data memory.

15. A facsimile system of distinctive ringing type according to claim 1, further comprising means for selecting one of a distinctive ringing ON mode in which said pattern determining means and said facsimile receiving means are operable, and a distinctive ringing OFF mode in which said pattern determining means and said facsimile receiving means are not operable.

* * * * *